United States Patent [19]

Leroy et al.

[11] 4,385,753
[45] May 31, 1983

[54] TUYERE FOR THE SIMULTANEOUS AND SEPARATE INTRODUCTION OF AT LEAST ONE GAS AND ONE POWDER MATERIAL

[75] Inventors: Pierre J. Leroy, Saint-Germain-en-Laye; Maurice Deschamps, Roche-la-Moliere, both of France; Emile Sprunck, 5 rue Joffre, 57250 Moyeuvre Grande, France

[73] Assignees: Creusot-Loire; Emile Sprunck, both of Paris, France

[21] Appl. No.: 239,742

[22] Filed: Mar. 2, 1981

[30] Foreign Application Priority Data

Mar. 5, 1980 [FR] France .................................. 80 04932
Jan. 27, 1981 [FR] France .................................. 81 01489

[51] Int. Cl.³ ............................................. C21B 7/16
[52] U.S. Cl. ........................................ 266/268; 75/52; 75/59; 75/60
[58] Field of Search ..................... 266/268; 75/59, 60, 75/52

[56] References Cited

U.S. PATENT DOCUMENTS

| | | | |
|---|---|---|---|
| 3,751,242 | 8/1973 | Knuppel | 75/52 |
| 3,771,998 | 11/1973 | Knuppel | 75/52 |
| 3,811,386 | 5/1974 | Knuppel | 266/268 |
| 3,817,744 | 6/1974 | Leroy | 266/268 |
| 3,819,165 | 6/1974 | Courard | 266/268 |
| 3,898,079 | 8/1975 | Eriksson | 266/268 |
| 4,040,612 | 8/1977 | Leroy | 266/268 |
| 4,249,714 | 2/1981 | Knuppel | 266/268 |

*Primary Examiner*—P. D. Rosenberg
*Attorney, Agent, or Firm*—Pollock, Vande Sande & Priddy

[57] ABSTRACT

Tuyere for the processing of metals in the liquid, solid or pasty state, and capable of introducing simultaneously and separately a gas and a powdered material. The tuyere comprises at least two well-centered concentric tubes, the gas being introduced into a non-external tube, and the powdered and compressed material being introduced into another tube, which is lubricated on its inner wall by a film of a lubricating substance introduced through a slot formed therein. The outer tube is traversed by an agent protecting the tuyere against its hot wear.

6 Claims, 6 Drawing Figures

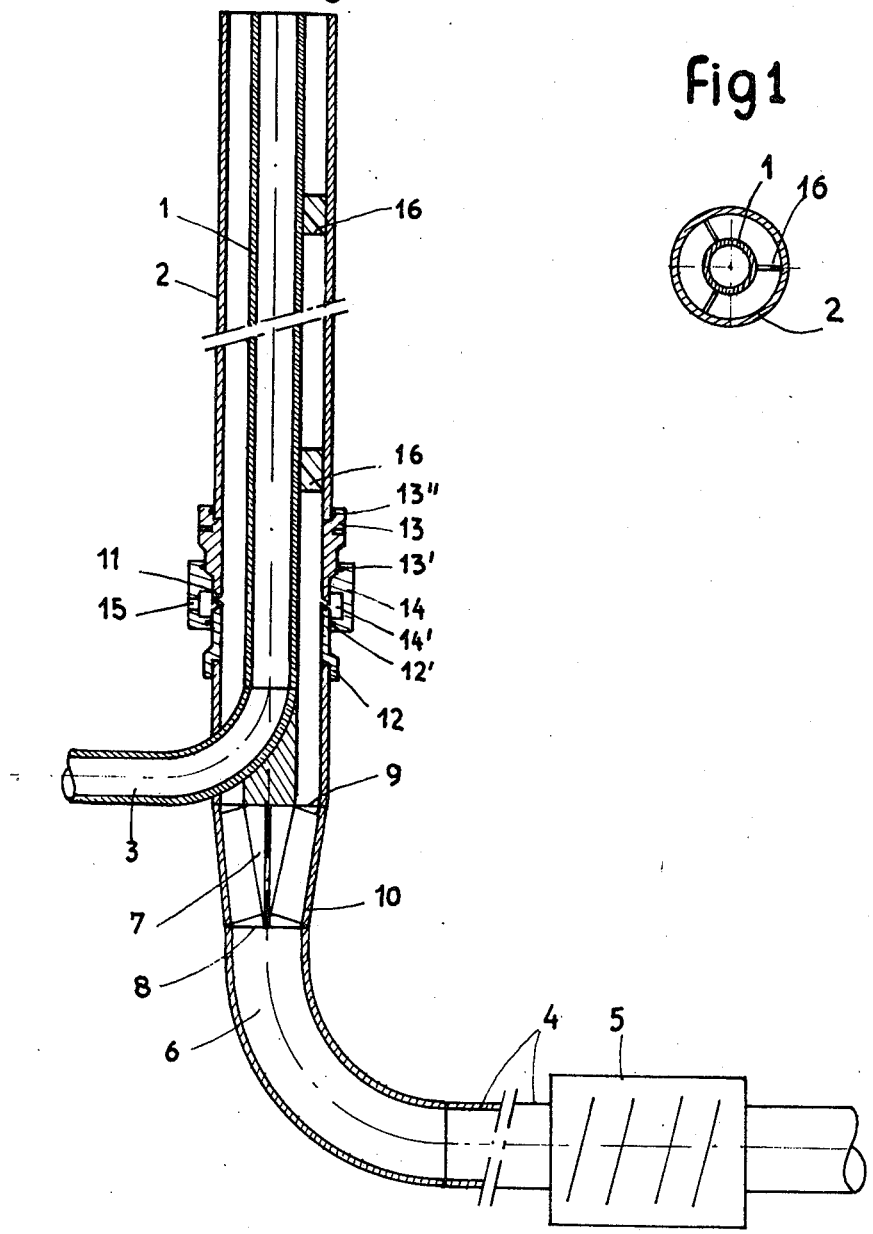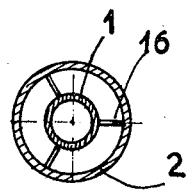

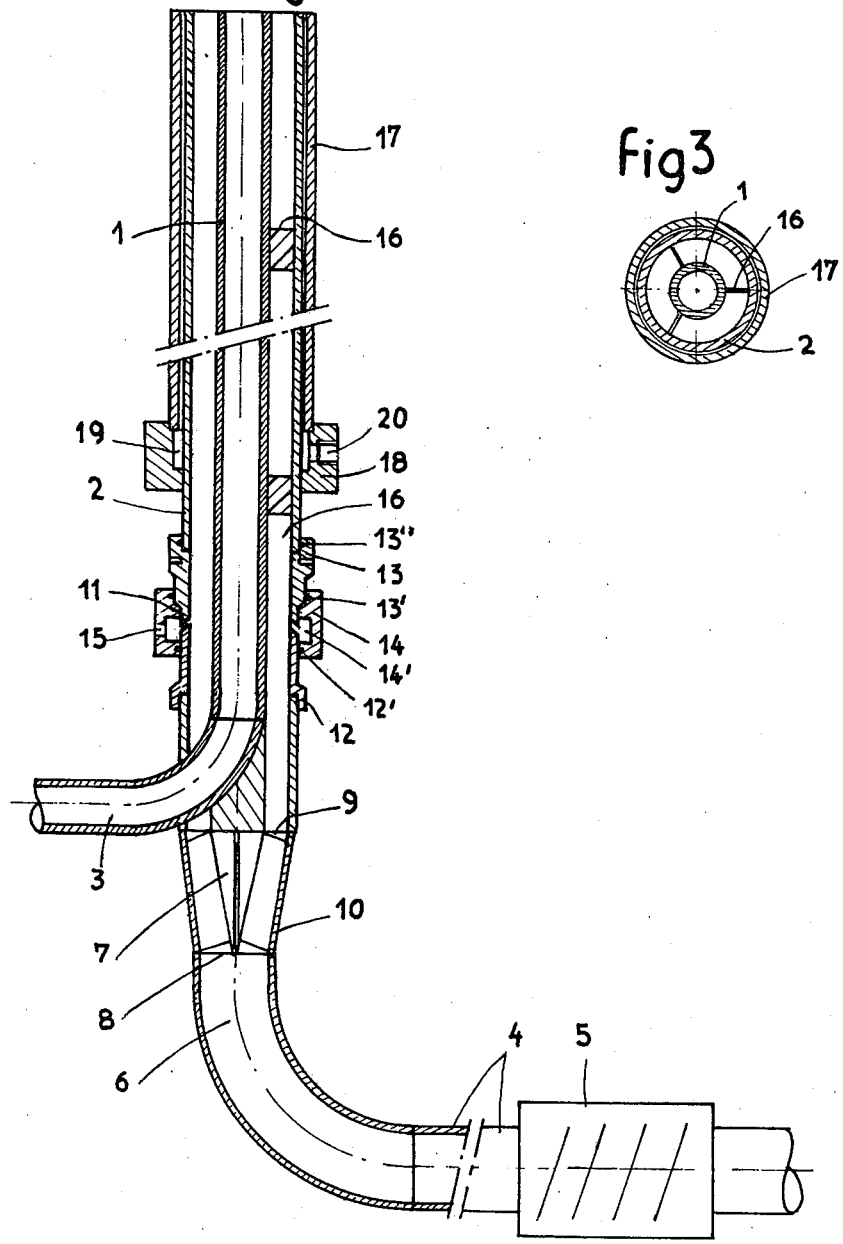

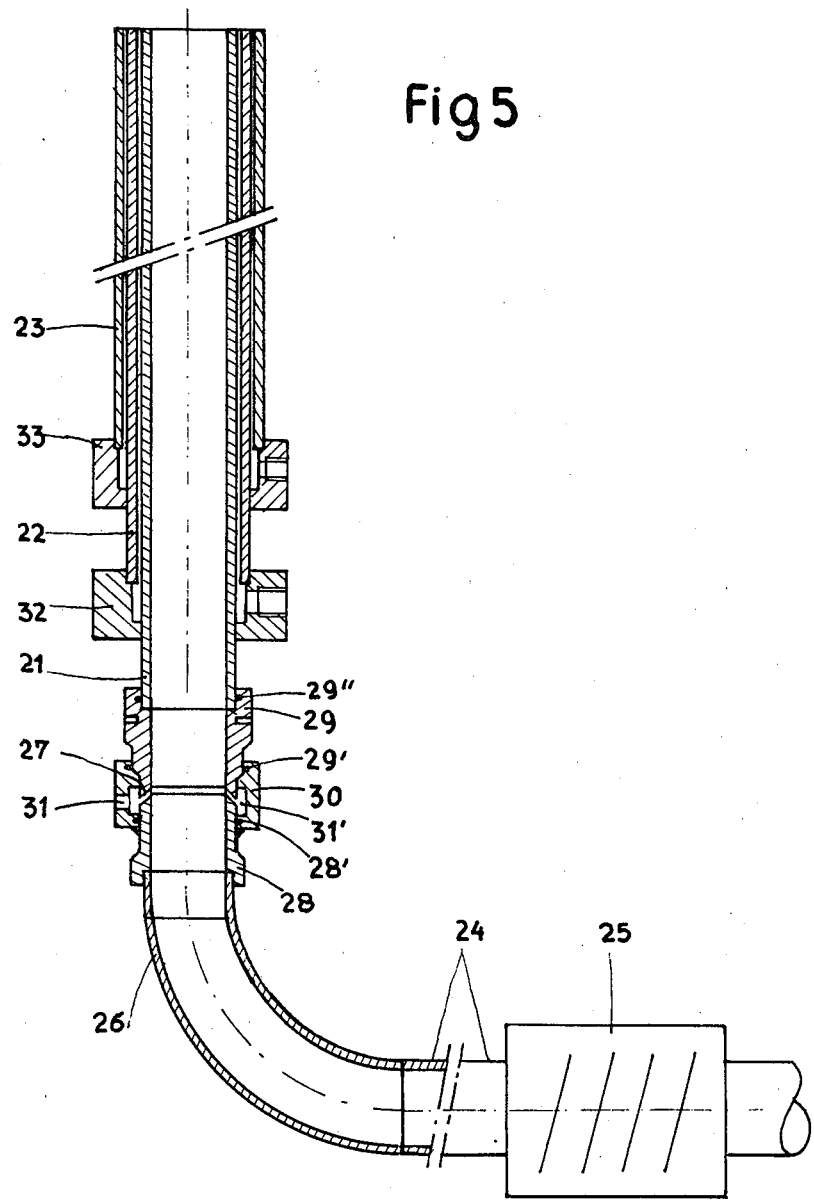

TUYERE FOR THE SIMULTANEOUS AND SEPARATE INTRODUCTION OF AT LEAST ONE GAS AND ONE POWDER MATERIAL

BACKGROUND OF THE INVENTION

The present invention relates to tuyeres for use in the processing of metals in liquid, solid or pasty state.

Tuyeres used in metallurgy can be simple (with a single tube), double (with two concentric tubes) or multiple (with several concentric tubes).

They can serve for the introduction either of gases, oxidizers, neutral substances or reducing agents, or of liquids, for example of liquids for protecting tuyeres against hot wear, or of powdered, oxidizing, reducing, or slag-making materials.

The usual method for transporting or introducing a powered material into a metallurgical container consists of suspending this powder in a carrier gas. This method has three drawbacks in the case of a metallurgical operation:

(a) It results in a consumption of carrier gas which is not negligible.

(b) The carrier gas, dissolving at least partly in the metal bath, may be troublesome in the processing of the metal being treated, and also in the exhaust gases.

(c) The powder thus suspended generally has a pronounced abrasive effect on the walls of the ducts and of the tubes that it traverses.

Another method, known in the domain of transportation of petroleum products, but not applied in metallurgy, consists of introducing the viscous or powdered material under increased pressure by any known mechanical means, such as an Archimedes screw, into a tube or into a duct whose inner wall is coated with a lubricating liquid film introduced from place to place along the tube or of the duct. In this way the drawbacks of the previously described method are avoided.

On the other hand, in many cases of processing a metal in a liquid state, it is useful, sometimes even indispensable, for the refinery gas, e.g., an oxidizing gas, to be kept out of contact with the powdered substance, e.g., powdered coal.

It is an object of the present invention to provide a tuyere useful in methods of processing metals in a liquid state or even solid or pasty state, enabling the simultaneous or separate introduction of at least one gas and one powdered material, without using any carrier gas for said powdered substance and without causing any abrasive action by the latter.

SUMMARY OF THE INVENTION

To this end, the present invention provides a tuyere including at least two well-centered concentric tubes, wherein at least one gas is introduced into a non-external tube, while the powdered and compressed material is introduced into another tube, which is lubricated on its inner wall by a film of lubricating substance introduced through a slot formed in said tube, while the outer tube is traversed by a protective agent against hot wear, such as propane, natural gas, fuel-oil, liquid carbon dioxide, a paste or powder containing carbon, which can be said powdered and compressed material itself, and the like.

In a first embodiment of the invention, for a tuyere with two tubes, the gas traverses the central tube, while the powdered and compressed material traverses the lubricated outer tube and itself assures protection of the tuyere against hot wear, for example, if it contains sufficient carbon. In this case, the protection by a special protective agent becomes unnecessary, and the tuyere can then be limited to the two concentric tubes.

In a second embodiment, for a tuyere with three tubes, the gas traverses the central tube, the powdered material traverses the lubricated intermediate tube, and the protective agent, e.g., domestic fuel oil, traverses the outer tube of the tuyere. In this case, the powdered material is not able to assure protection of the tuyere against hot wear.

In a third embodiment, also for a tuyere with three tubes, the powdered material traverses the lubricating central tube, the gas traverses the intermediate tube, and the protective agent, e.g., domestic fuel oil, traverses the outer tube of the tuyere.

In a fourth embodiment, for a tuyere with four concentric tubes, intended to introduce separately and simultaneously two different gases and a powdered material into a metallurgical container, the powdered and compressed material traverses the central tube, lubricated on its inner wall by a film of a lubricating substance introduced through a slot formed in said central tube, the first gas, which may be steam or oxygen, traverses the first intermediate tube, and the second gas, which may be oxygen or steam, traverses the second intermediate tube, while the protective agent for the tuyere against its hot wear traverses the outer tube of the tuyere, said oxygen being able to hold in suspension lime powder and/or limestone powder and/or ore powder.

Other modifications are possible, without departing from the scope of the invention.

In the first two embodiments, the powdered material takes an annular passage in the tuyere. It comes from a lubricated circular duct in which it is propelled by any mechanical means, such as an Archimedes screw.

Its adaptation to an annular duct is effected by widening of the circular duct, by means of an inner cone suitably positioned in the widening zone. The latter is in fact constituted by an outer conical frustum connecting two circular pipes. The inner cone is profiled according to the outer conical frustum. All the walls in contact with the powdered material are lubricated.

In these various modifications, it is possible for the gas to serve as a support for another powdered material, in suspension, with which it is compatible, e.g., oxygen holding powdered lime in suspension. However, this powdered material suspended in the gas does not constitute a characteristic of the present invention, the object of which is to introduce separately a gas and a powdered material when contact between them is to be avoided before their introduction into the metal bath. The metallurgical applications of tuyeres according to the invention can be very numerous.

They may be used, for example, to introduce into an iron-based liquid bath, separately and simultaneously, oxygen on the one hand, and powdered coal on the other hand. In such an operation, the object sought may be, for example, gasification of the powdered coal, or indeed remelting of iron sponge or scrap, with or without direct reduction of ore in liquid phase, with or without recovery of combustible exhaust gas.

It is also possible to use the tuyeres according to the invention in the refining of cast iron into steel, to introduce powdered lime (or limestone, or ore), without suspending it in the refining oxygen. In this way, the abrasive effect, by the powdered lime, or the limestone, or the ore, on the duct and on the oxygen tube of the tuyere, is avoided. One also avoids giving the lime particles a notable exit speed at the nozzle of the tuyere, which can sometimes present the drawback of drawing lime particles directly through the bath and into the gases of the converter.

In order that the invention may be more clearly understood, there are described below, by way of non-limiting examples, four embodiments of a tuyere according to the invention.

BRIEF DESCRIPTION OF THE DRAWINGS

FIG. 1 is a cross-section of a double tuyere.
FIG. 2 is a longitudinal section of the same tuyere.
FIG. 3 is a cross section of a triple tuyere.
FIG. 4 is a longitudinal section of the same tuyere.
FIG. 5 is a longitudinal section of another embodiment of a triple tuyere.

DETAILED DESCRIPTION OF PREFERRED EMBODIMENTS

Figure 6:
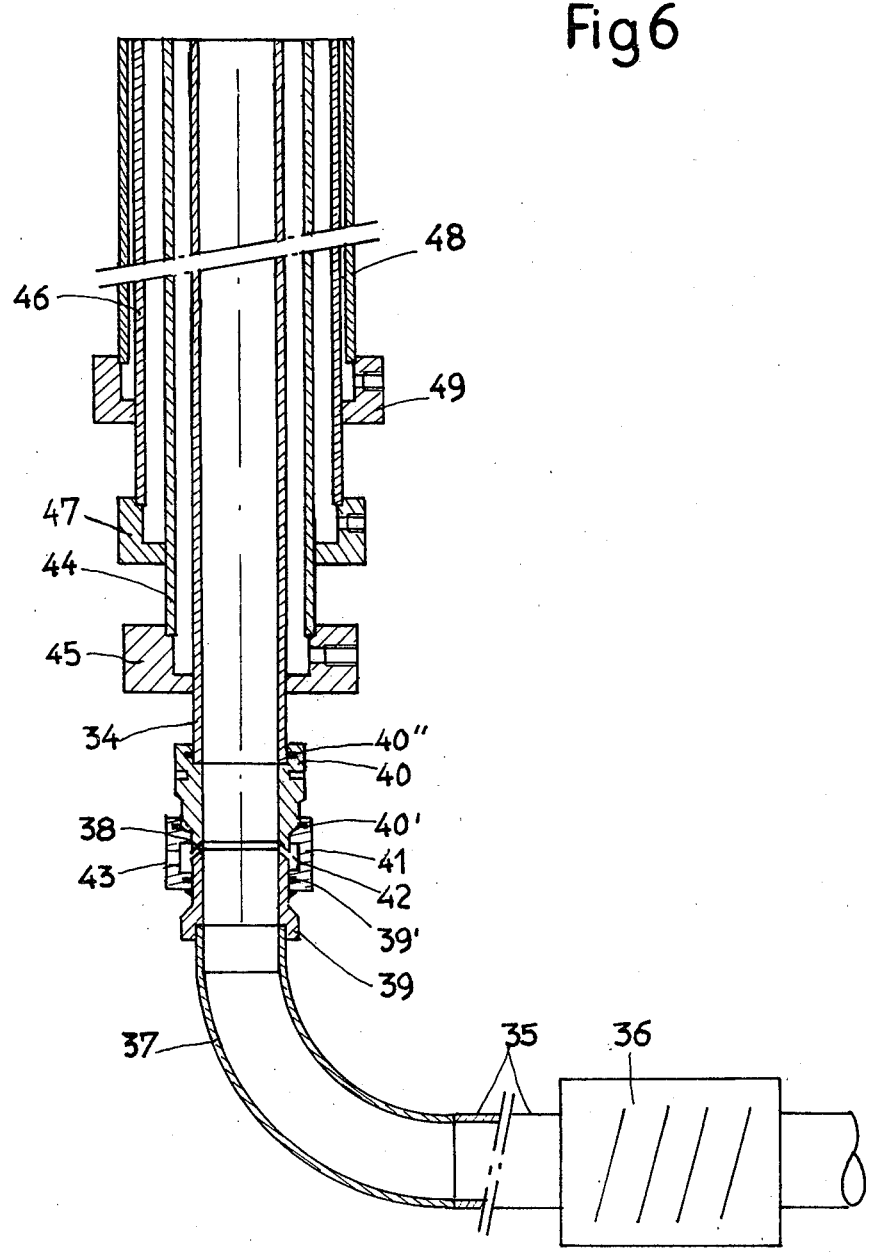
FIG. 6 is a longitudinal section of a quadruple tuyere.

Let us first examine the first embodiment of a tuyere according to FIGS. 1 and 2. In this example, the gas introduced into the central tube is oxygen, and the powdered material introduced into the outer tube is powdered coal.

The central tube 1 of the double tuyere is traversed by oxygen, coming from a pipe 3. The outer tube 2 is traversed by the powdered coal under pressure, propelled into a duct 4 by an Archimedes screw situated in the device 5. After the elbow 6, a cone 7, supported on braces 8 and 9 and placed at the center of a conical frustum 10 which extends the elbow 6, converts the cylindrical flow of powdered coal coming from the elbow 6 into an annular flow between the tubes 1 and 2 of the tuyere.

In order that the thrust of the Archimedes screw may suffice to assure the flow of powdered coal without risk of blocking, it is necessary for the wall to be lubricated. In the present example, the lubrication is assured by heavy fuel-oil, which is introduced in small amounts so as to form a very thin film on the wall. In the tuyere under consideration, the introduction of this lubricant on to the inner wall of the outer tube 2 is effected in known manner through a circular slot 11 formed between the sleeves 12 and 13, and arranged at 45° in the direction of flow.

These two sleeves 12 and 13 are held together by means of a ring 14.

Over the whole circumference of the slot 11, the lubricant is distributed by the torus 14', fed through a small channel 15 pierced in the ring 14 and suitably connected to a source of lubricant (not shown).

A first toric seal 12' assures fluid-tightness between the sleeve 12 and the ring 14.

Another toric seal 13' assures fluid-tightness between the sleeve 13 and the ring 14, while a third toric seal 13" assures the fluid-tightness between the sleeve 13 and the tube 2.

Throughout the supply duct 4 for powdered charcoal, the lubrication of the inner wall of the duct 4 is assured by the introduction, from place to place, at regular intervals, of small amounts of heavy fuel-oil by means of circular slots and sleeves similar to the slot 11 and to the sleeves 12, 13 and 14, but not shown in FIG. 2.

The tube 1 is centered in the tube 2 by means of braces such as 16 sufficiently fine not to interfere with the flow of powdered coal between the two tubes 1 and 2 of the tuyere.

In this first embodiment of a tuyere according to the invention, the powdered coal contains a high proportion of carbon sufficient to assure the protection of the tuyere against hot wear in the presence of a liquid metal bath in a converter, although the bath may not be entirely decarburized, which is the case for a certain number of operations, such as gasification of the coal, remelting of scrap iron and iron sponge, etc., in which a certain carbon content is maintained in the bath. It is not then necessary to introduce a special protective agent into the tuyere, since the protection is already assured by the powdered coal.

On the other hand, when the powdered material is not capable by itself of assuring the protection of the tuyere against wear, for example if it relates to iron ore, or limestone, or any other powdered material devoid of carbon, it is necessary to resort to the second or third kind of tuyere of the triple tuyere type, with a special protective agent separate from the powdered material, or to the fourth kind.

The second embodiment of a tuyere according to the invention shown in FIGS. 3 and 4 differs from the preceding one only in that it includes in addition a third tube 17, outside the tubes 1 and 2, supplied with a protective agent against wear, which here is domestic fuel oil, through a sleeve 18 provided with a hollow torus 19 fed through a channel 20. With such a tuyere, the powdered material here is a mixture of iron and limestone, abrasive materials if they were suspended in a carrier gas, and harmless in this type of tuyere. The gas which passes through the central tube 1 is again oxygen, and the tuyere is used for refining cast iron into steel in a converter.

In the third embodiment of a tuyere according to the invention, shown in FIG. 5, the gas introduced in the tuyere is oxygen, while the powdered material used is powdered coal. Any other powdered material, whether abrasive or not, could be used such as iron ore, lime, flux, spar, etc., depending on the metallurgical operation concerned.

The central tube 21 of the triple tuyere is here traversed by the powdered coal under pressure, thrust into the duct 24 by an Archimedes screw located in the device 25, and then arriving through the elbow 26.

The lubricant is again constituted by heavy fuel-oil. It is introduced through a circular slot 27 formed between the sleeves 28 and 29, and arranged at 45 in the direction of the flow of the powdered coal.

These two sleeves 28 and 29 are assembled by means of a ring 30.

Over the whole circumference of the slot 27, the lubricant is distributed through the torus 30' fed through a small channel 31 pierced in the ring 30 and suitably connected to a lubricant source (not shown) in the FIG. 5.

The first toric seal 28' assures fluid-tightness between the sleeve 28 and the ring 30.

Another toric seal 29' assures fluid-tightness between the sleeve 29 and the ring 30, while a third toric seal 29" ensures the fluid-tightness between the sleeve 29 and the tube 21.

It is by the assembly of the sleeves 28 and 29 and of the ring 30 that the elbow 26 is connected to the tube 21.

The duct 24 for supplying powdered coal is lubricated from place to place in similar manner, as indicated above with respect to the first embodiment.

The intermediate tube 22 of the tuyere is here supplied with oxygen, by means of a hollow sleeve 32.

The outer tube 23 is supplied with a protective agent against wear, which here is domestic fuel-oil, by means of a hollow sleeve 33.

In a fourth embodiment of a tuyere according to the invention, shown in FIG. 6, the two gases to be introduced separately into the tuyere are steam and oxygen, and the latter can contain in suspension, at certain times or even constantly, lime powder, while the powdered material used is powdered coal.

In this embodiment, the metallurgical objective is gasification of the coal in a ferrous bath with a carbon content at a temperature which varies little, with or without remelting of iron sponges or of scrap iron, with or without direct reduction of the iron ore in liquid phase, the regulation of the respective flow rates of oxygen and of steam enabling the thermal control of the operation to be fully governed, the separate introduction of coal enabling the rate of gasification to be regulated, and the adjustment of the flow rate of lime powder in suspension in the oxygen enabling the formation of the slag to be controlled, which makes possible by scouring the removal of considerable part of the sulfur from the coal. The protection of the tuyere against wear is independently assured by a peripheral protective agent.

In FIG. 6, the central tube 34 of the quadruple tuyere is traversed by the powdered coal under pressure, pushed into the duct 35 by an Archimedes screw located in the device 36 and then arriving through the elbow 37.

The lubricant is constituted by heavy fuel oil. It is introduced through a circular slot 38 formed between the sleeves 39 and 40, and arranged at 45° in the direction of the flow of the powdered coal.

These two sleeves 39 and 40 are assembled by means of a ring 41.

Over the whole circumference of the slot 38, the lubricant is distributed through the torus supplied through a small channel 43 pierced in the ring 41 and suitably connected to a lubricant source (not shown).

A first toric seal 39' assures the fluid-tightness between the sleeve 39 and the ring 41. Another toric seal 40' assures fluid-tightness between the sleeve 40 and the ring 41, while a third toric seal 40" assures fluid-tightness between the sleeve 40 and the central tube 34.

The first intermediate tube 44 of the quadruple tuyere is here fed with steam, by means of a hollow sleeve 45.

The second intermediate tube 46 is here fed with oxygen holding lime powder in suspension, by means of a hollow sleeve 47.

Finally, the outer tube 48 is fed with a protective agent for the tuyere against wear, which here is domestic fuel oil, by means of a hollow sleeve 49.

The tuyeres according to the invention are especially applicable in metallurgical converters, such as steel converters.

I claim:

1. Tuyere for the simultaneous but separate introduction into a metallurgical vessel of at least one gas and one powdered material, said tuyere comprising
   (a) a non-external tube for the introduction of said gas;
   (b) at least one tube concentric with said non-external tube for the introduction of said powdered material exclusively, without the use of a carrier gas;
   (c) means for lubricating the inner wall of the tube receiving said powdered material, comprising at least one orifice in the wall of the latter tube; and
   (d) means for propelling said powdered material into said lubricated tube;
   (e) means for protecting said tuyere against hot wear by an agent in said at least one tube exterior to said non-external tube;
   (f) whereby abrasive action of said powdered material on the walls of said tubes is substantially avoided.

2. Tuyere according to claim 1, comprising an inner tube and one concentric exterior tube, said exterior tube having a slot therein for introducing a lubricant, said means for protecting said exterior tube against hot wear comprising a carbon component of said powdered material itself.

3. Tuyere according to claim 1, comprising an inner tube for the introduction of said gas, an intermediate tube and an outer tube both concentric with said inner tube, said intermediate tube receiving said powdered material and having a slot therein for the reception of said lubricant, said outer tube receiving an agent for protecting said tuyere against hot wear.

4. Tuyere according to claim 1, comprising one inner tube for the introduction of said powdered material, said inner tube having a slot therein for the reception of said lubricant, an intermediate tube for the introduction of said gas, and an outer tube receiving an agent for protecting said tuyere against hot wear.

5. Tuyere according to claim 1, for the simultaneous but separate introduction into said metallurgical vessel of two distinct gases and a powdered material, and comprising four concentric tubes, said powdered material traversing the innermost tube, lubricated on its inner wall by a film of lubricating substance introduced through a slot in said inner tube; the first gas traversing a first intermediate tube; the second gas traversing a second intermediate tube external to said first intermediate tube, one of said gases being oxygen and the other of said gases being steam, and an agent for protecting the tuyere against hot wear traverses the outermost tube, said oxygen being able to hold in suspension lime-containing material.

6. Tuyere as set forth in claim 2 or 3, comprising means for constraining said powdered material under pressure coming from a lubricated circular duct is constrained to cause it to traverse a lubricated annular duct, said means comprising a cone placed at the center of a conical frustum for forming the coupling between two circular ducts of different diameters.

* * * * *